United States Patent [19]

Emmel

[11] 4,097,324

[45] Jun. 27, 1978

[54] METHOD AND APPARATUS FOR MAKING AN ELONGATED LATTICE STRUCTURE

[76] Inventor: Leroy L. Emmel, 1800 Wallace Ave., Apt. R, Costa Mesa, Calif. 92627

[21] Appl. No.: 784,603

[22] Filed: Apr. 4, 1977

[51] Int. Cl.² .................. B29D 3/00; B29C 27/02
[52] U.S. Cl. .................... 156/179; 156/245; 264/248; 264/251; 264/261; 264/271; 264/280; 264/320; 425/505; 425/508; 425/509; 425/517
[58] Field of Search ............... 264/248, 322, 263, 156, 264/294, 271, DIG. 70, DIG. 81, 272, 320, 251, 280; 156/196, 242, 245, 252, 309, 500, 475, 499, 543, 436, 582, 583, 179; 425/115, 224, 363, 517

[56] References Cited

U.S. PATENT DOCUMENTS

| | | | |
|---|---|---|---|
| 3,532,570 | 10/1970 | Cotter ................................. | 156/309 |
| 3,719,538 | 3/1973 | Carlson et al. ....................... | 156/436 |
| 3,755,035 | 8/1973 | Olson et al. ......................... | 156/196 |
| 3,938,931 | 2/1976 | Emmel ................................. | 156/499 |

Primary Examiner—Willard E. Hoag
Attorney, Agent, or Firm—Raymond L. Madsen

[57] ABSTRACT

There is disclosed a lattice structure having a plurality of elongated parallel elements interconnected periodically by integrally formed ribs therebetween and a plurality of elongated filaments, each of which is embedded in and adhered to one of the elongated parallel elements. The structure is constructed by a method which includes the steps of molding the lattice structure from film or laminate belts, heating the filaments above the melting temperature of the molded lattice structure, joining the heated elements with the structure and solidifying the lattice structure adjacent each filament. The steps are performed by a machine which has rotating cylindrical drums in rolling contact to heat and mold the lattice structure therebetween, a heated cylindrical drum over which the filaments are passed to heat them to a temperature above the melting temperature of the molded lattice structure, contacting rotating cylindrical drums between which the molded elements of a lattice structure and the filaments are passed to join the filaments into the lattice structure and a pair of cooled rotating drums in rolling contact between which the joined structure is directed to solidify the combination.

11 Claims, 12 Drawing Figures

METHOD AND APPARATUS FOR MAKING AN ELONGATED LATTICE STRUCTURE

The present invention relates to conductor cables which typically comprise a number of longitudinally extended transversely spaced conductor elements embedded in an insulating structure and more particularly to flexible modular transmission lines and methods and machinery for making the same.

In the field of multi-conductor flat cable, it has been the general practice to employ manufacturing apparatus and methods of manufacturing for laminating or sandwiching conductor elements or ribbons in laterally spaced relation within an insulating web, such methods and manufacturing techniques involving the application of heat and pressure to conductor elements and plastic webs in hot and chill roll machines to obtain a unitized structure of conductor elements sandwiched between the plastic webs or belts. The conductor elements have been composed of any suitable electro-conductive material which also exhibits the other necessary qualities of flexibility and strength, an example of which is copper, and the cross-section form ordinarily being round or rectangular. The insulating material of such flat conductor cables is generally of Teflon, polyester, or polyvinyl chloride plastics which are either thermo-plastic or may be coated with a thermo-plastic or thermo-setting adhesive so that the conductor elements may be sandwiched between the webs of insulating material, and the sandwich unitized by the application of heat and pressure.

Although such devices have served the purpose, they have not proved entirely satisfactory under all conditions of service for the reason that considerable difficulty has been experienced in obtaining the desired flexibility of the unitized structure and difficulties encountered in propagating high frequency pulses and electrical information therealong.

Those concerned with the development of multi-conductor flat cable have long recognized the need for cable structures and manufacturing methods which conserve or minimize the amount of thermo-plastic films in which the conductors are embedded. Another need recognized is the need to reduce plastic shrink stresses and the bulk rigidity of the flat cable end product. A further need recognized is the need for wire termination accessibility without distorting the insulation sheath. The present invention fulfills these needs.

One of the most critical problems confronting designers of high frequency flat cable transmission lines has been the capability of these cables to transmit high frequencies or fast rise time pulses. Flat cables of the conventional type are being used to transmit signals with rise times of a few nanoseconds and are performing quite satisfactorily. However, with advancements in the state of the art of sophisticated electronics, conventional flat cables are being pushed to the limit of their cabability. Crosstalk from one signal line to another is often of a magnitude whereby it is sufficient to trigger adjacent circuits such as where the cable is employed in a computer. Interference between adjacent signal lines increases as pulse rise times become faster. Crosstalk is primarily due to the extension of the electromagnetic field of one transmission line to another transmission line thereby inducing crosstalk signals therein. If the propagation along the transmission line is confined within the boundaries of a uniform dielectric material, not only is crosstalk reduced, but there is only one propagation velocity in the cable transmission line. If the electromagnetic field extends beyond the solid dielectric of the cable into the surrounding air, signal distortion results, excessive ringing occurs and differential crosstalk coupling results. These problems are overcome by the present invention.

The general purpose of this invention is to provide a lattice web or belt flat cable and methods and apparatus for manufacturing the same which embrace all the advantages of similarily employed flat cables, methods and manufacturing apparatus and possesses none of the aforedescribed disadvantages. To attain this, the present invention contemplates a unique lattice structure in which elongated conductive elements are embedded whereby high frequency limitations, bulk rigidity and shrink forces are avoided.

An object of the present invention is the provision of an elongated filament lattice structure using a minimum of insulative material and having a high flexibility.

Another object is to provide a low mass, flat cable having wire termination accessibility without distorting the insulation sheath.

A further object of the invention is the provision of a lattice flat cable structure which allows the application or lamination of an exterior jacket joined through the lattice openings.

Still another object is to provide a lattice flat cable structure which has improved high frequency performance characteristics.

A still further object is to provide a lattice flat cable having precise dimensional characteristics and stability.

Yet another object of the present invention is the provision of a manufacturing method and apparatus for the fabrication of flat cable which uses a minimum of insulative material through the process of redistribution of the insulative plastic film by melted bulk flow out of the area between adjacent wires and into the area adjacent the wire.

A still further object is a manufacturing method and apparatus for the production of lattice flat cable in which the mass of the individual thermoplastic strips is related to the mass of the wire to be embedded therein.

Yet a further object of the invention is the provision of a manufacturing process and a manufacturing machine for lattice flat cable in which each wire is preheated to a temperature sufficient so that the wire supplies the heat of fusion to its associated insulative members which are presented to the wires at temperatures below that of melting.

Another object of the present invention is the provision of the ease of separation of one or more wires from the lattice cable structure.

A still further object of the present invention is the provision of a flat cable having an interconnecting jacket for stacking layers of cables together.

Yet another object of the present invention is the provision of a flat lattice cable having an interconnecting jacket which reduces signal distortion, ringing, and crosstalk.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
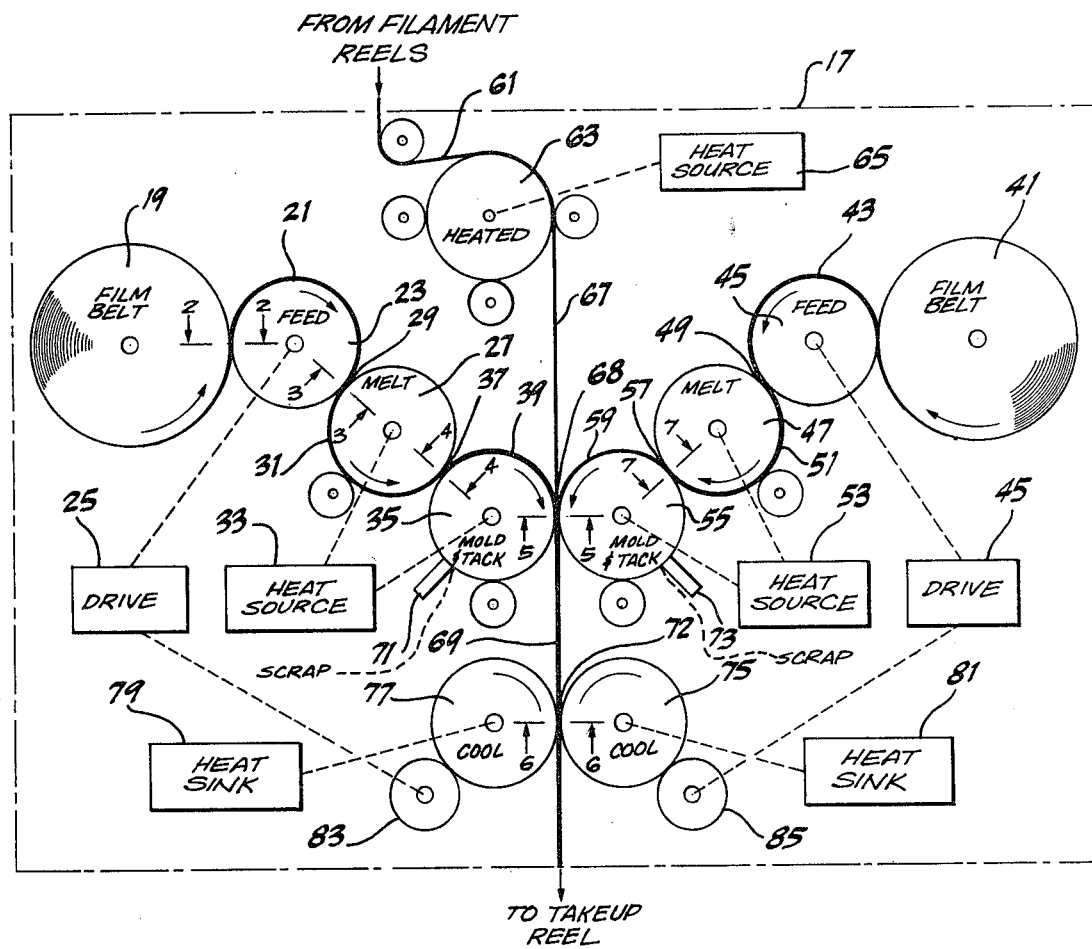
FIG. 1 shows a block diagram of a preferred embodiment of apparatus for the production and manufacture of lattice cable.

Referring now to the drawings, wherein like reference characters designate like or corresponding parts throughout the several views, there is shown in FIG. 1 (which illustrates a preferred embodiment of a machine and method for the manufacture of lattice flat cable) a film belt roll 19 is rotatably mounted on a base member 17 and adjustably biased against the exterior surface of a cylindrical feed drum 21 rotatably attached to base member 17. Film belt 19 may contain thermoplastic film such as Teflon FEP or polyvinyl cloride or the like. A film belt 21 is passed circumferentially around feed drum 23, feed drum 23 being driven clockwise in the direction of the arrow by a drive mechanism 25 which may be a motor and chain, belt or gear drive well known to the designers of cable making machinery. A cylindrical melt drum 27 is rotatably attached to base member 17 and the exterior surface thereof in contact with the exterior cylindrical surface of feed drum 21. Melt drum 27 has a multiplicity of circumferential ridges spaced therearound (not illustrated). The contacting surfaces of feed drum 21 and melt drum 27 form a nip 29 through which film belt 21 is directed. A heat source 33, which may be an electric heater or the like preferably located within drum 27, heats melt drum 27 to a temperature sufficient to soften and melt film belt 21 to form a melted film belt 31 which is directed around the circumference of melt drum 27 into a nip 37 formed between the contacting exterior cylindrical surfaces of melt drum 27 and a mold and tack drum 35 which is cylindrical in shape and rotatably attached to base member 17. Mold and tack drum 35 is heated to a temperature below the melting temperature of film belt 31 and as film belt 31 it passes through nip 37 it is molded and after it leaves nip 37 it is solidified but kept near melting temperature. The cylindrical surface of mold and tack drum 35 has a multiplicity of circumferential grooves therearound (not visible) which mate with the circumferential ridges of melt drum 27. Also in the surface of drum 35 there are longitudinal slots (not visible) periodically spaced like the rungs of a ladder between the circumferential grooves. Therefore as melted film belt 31 enters nip 37 it is squeezed and displaced between the confronting surfaces of melt drum 27 and mold and tack drum 35 to mold the film into the circumferential grooves and longitudinal slots of mold and tack drum 35. Also, the circumferential ridges of melt drum 27 mold elongated depressions into the film's surface which they confront. Consequently, an insulative lattice web structure 39 is formed having elongated insulative elements with elongated depressions therealong directed circumferentially around mold and tack drum 35 which elements are integrally connected by periodically spaced ribs or cross-segments or strips of film or insulative material. Insulative lattice structure 39 is held below its melting temperature by heat source 33 which applies heat to mold and tack drum 35 to maintain the temperature of drums 35 below the melting temperature of lattice structure 39.

A film belt roll 41 similar to roll 19 is rotatably mounted on base member 17 and is adjustably biased in contact with the exterior surface of a cylindrical feed drum 45 rotatably mounted on base member 17. Film belt 43 is directed from film belt roll 41 circumferentially around the cylindrical surface of feed drum 45 which is substantially similar to feed drum 23. A driving mechanism 45 similar to drive 25 is connected to and rotates feed drum 45 counter clockwise in the direction of the arrow. The exterior surface of feed drum 45 is in contact with the exterior surface of a cylindrical melt drum 47 rotably mounted on base member 17 to form a nip 49 therebetween through which film belt 43 is directed. Melt drum 47 is substantially similar to melt drum 27 with a multiplicity of circumferential ridges spaced therearound (not illustrated). A heat source 53, similar to heat source 33, heats melt drum 47 to a temperature sufficiently to soften and melt the film belt which contacts its surface. Therefore, as film belt 43 passes through nip 49, the heated surface and ridges of melt drum 47 contact film belt 43 to form a melted film belt 51 which is directed around the circumference of melt drum 47. A cylindrical mold and tack drum 55 is rotatably attached to base member 17 and has its exterior surface in contact with the exterior surface of melt drum 47 to form a nip 57 into which melted film belt 51 is directed. The exterior surface of mold and tack drum 55 has a multiplicity of circumferential grooves therearound (not visible) which mate with the ridges of melt drum 47. However, unlike mold and tack drum 35, mold and tack drum 55 does not have any longitudinal slots interconnecting the circumferential grooves. Therefore, as melted film belt 51 passes through nip 57 the mating surfaces of melt drum 47 and mold and tack drum 55 displace and redistribute melted film belt 51 into the circumferential grooves of mold and tack drum 55 to form a multiplicity of elongated strips of insulative film material each having an elongated depression or groove therealong impressed therein by the ridges of melt drum 47. It is to be noted that the multiplicity of strips 59 are not connected as is the lattice structure 39. Heat source 53 maintains a temperature of mold and tack drum 55 below the melting temperature of the insulative film to solidify the multiplicity of strips 59 but keep the temperature of strips 59 near melting.

A multiplicity of elongative filaments 61 which may be conductive wires or optical fibers are directed from reels over a cylindrical heated drum 63 heated to a temperature by a heat source 65, which may be similar to heat sources 33 and 53, to a temperature sufficient to heat elongated filaments 61 to a temperature sufficient to melt the thermoplastic insulative film which comes in contact with it. The heated filaments 67 are then aligned between insulative lattice structure 39 and insulative strips 59 opposite the elongated depressions therein and the combination is directed into a nip 68 formed between the exterior contacting surfaces of mold and tack drum 35 and mold and tack drum 55, the mold and tack drums being rotatably mounted on base member 17 so as to respectively contact melt drums 27 and 47, as previously described, in addition to contacting each other. As insulative lattice structure 39 and insulative strips 59 enter nip 68 heated filaments 67 are sandwiched therebetween in the elongated depressions or grooves formed in insulative lattice structure 39 and insulative strips 59 by the melt drums respectively forming guides to locate each filament centrally along each insulative strip and each elongated element of insulative lattice structure 39. As heated filaments 67 contact the grooves in the insulative material each filament melts the insulative material adjacent to it to form the material therearound and adhere the filament to the insulative material to minimize the heat transfer required to melt the insulative material, the insulative material is maintained near melting by drums 35 and 55. However, the temperature of the mold and tact drums 35 and 55 is low enough to maintain the exterior surface of the sandwich combination solid to form the combination into an insulated flat lattice cable structure 69. Heat from the heated filaments 67 not only melts the insulative material adjacent thereto but melts portions of the interfaces between the lattice structure 39 and insulative strips 59 so that when they are confronted in nip 68 they flow and adhere together. Heat continues to be transferred from the filaments to the insulative material adjacent thereto after lattice cable 69 leaves nip 68 to further melt the interfaces and material adjacent the filaments for complete adhesion of the filaments and insulative material. The flat lattice cable structure 69 is then directed into a cooling nip 72 formed between the exterior contacting surfaces of two cylindrical cool drums 77 and 75 rotatably attached to base member 17 and cooled by a heat sink 79 and a heat sink 81, respectively. Cool drum 77 is driven by a contacting wheel 83 which in turn is driven by drive 25. Similarly cool drum 75 is driven by a wheel 85 which in turn is driven by drive 45 as the cable leaves nip 72 it is directed to a takeup reel. The distance between nip 68 and nip 72, the speed of the cable, and the temperatures of heat are selected to permit melting of the material adjacent adjacent the filaments but to keep the exterior substantially solidified.

It is contemplated within the present invention that the method and apparatus shown in FIG. 1 may omit insulative strips 59 from the cable structure and use only the assembly of insulative lattice structure 39 with heated filaments 67. In order to do this, mold and tack drum 55 may have a smooth exterior surface or lightly grooved to accept and align heated filaments 67. Melt drum 49, feed drum 45 and film belt reel 41 would not be utilized in this instance. When heated filaments 67 enter nip 68 and contact insulative lattice structure 39, mold and tack drum 55 presses heated filaments 67 into the elongated depressions in insulative lattice structure 39 and the heat from heated filaments 67 melts the insulative material adjacent thereto to adhere the filaments into the insulative lattice structure. By controlling the depth of insertion, more or less of heated filaments 67 may be exposed in the resulting lattice cable structure to provide an exposed surface for making contact, such as when the filaments are electrical conductors and connections are desired to be made thereto.

Figure 2:
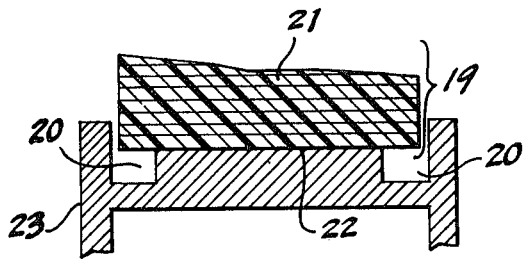
FIG. 2 illustrates a cross-section of a portion of the film belt roll and the feed drum taken on the line 2—2 of FIG. 1 looking in the direction of the arrows.

Turning now to FIG. 2, a portion of the cross-section between film belt 19 and feed drum 23 at their point of contact is illustrated showing film belt layers 21 of film belt roll 19 contacting surface 22 of feed drum 23. Feed drum 23 has circumferential grooves 20 opposite the edges of film belt layers 21 to accommodate the excess dimension of film belt layers 21 required to insure that enough insulative material is presented in the molding nips 37 and 57 to fill the grooves and slots in the surfaces of mold and tack drums 35 and 55.

Figure 3:
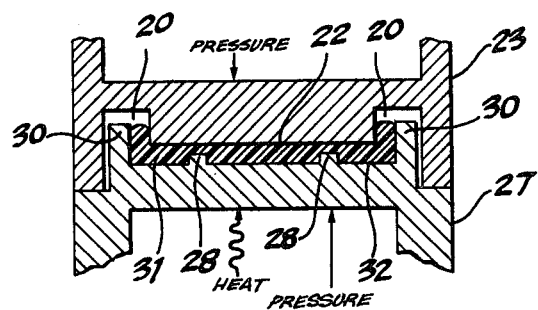
FIG. 3 shows a cross-section of a portion of the feed drum in contact with the melt drum taken on the line 3—3 of FIG. 1 looking in the direction of the arrows.

In FIG. 3 the cross-section of nip 29 is illustrated showing circumferential ridges 28 of melt drum 27 being pressed into the softened and melted surface of film belt 31. Guide ridges 30 at the edges of melt drum 27 direct the excess film belt insulative material into grooves 20 of feed drum 23.

Figure 4:
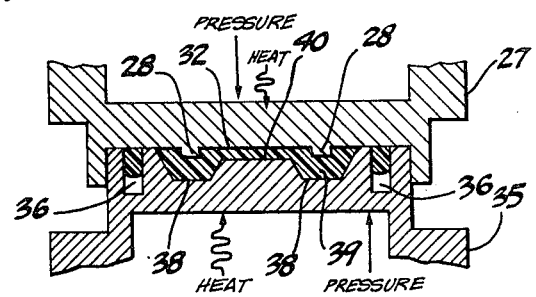
FIG. 4 illustrates a cross-section of a portion of the melt drum in contact with the mold and tack drum taken on the line 4—4 of FIG. 1 looking in the direction of the arrows.

There is shown in FIG. 4 a cross-section of nip 37 in which the insulative lattice structure 39 is molded. The heat from melt drum 27 has softened and melted film belt 31 so that as it enters nip 37 it may be readily displaced and redistributed between the surfaces of melt drum 27 and mold and tack drum 35 to fill a plurality of grooves 38 circumferentially located around the cylindrical surface of mold and tack drum 35, circumferential ridges 28 of melt drum 27 mating therewith, and a slot 40 which longitudinally connects grooves 38. Slot 40 is one of a multiplicity of interconnecting slots periodically connecting grooves 38 on the surface of drum 35.

The surplus or excess insulative material is squeezed from nip 37 and collected in grooves 36 of drum 35 and is removed therefrom by a scraper 71 shown in FIG. 1 which has edges that mate with and enter grooves 36 of drum 35. The scrap insulative material scraped from groove 36 is collected for reuse.

Figure 5:
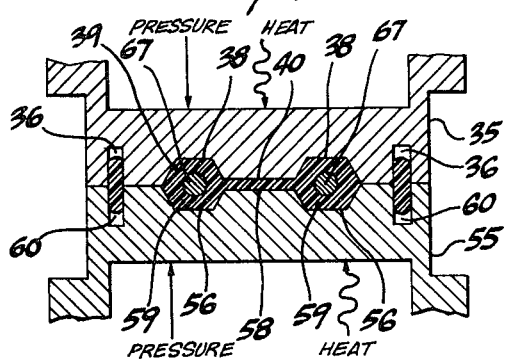
FIG. 5 illustrates a cross-section of a portion of the mold and tack drums at their point of contact taken along the line 5—5 of FIG. 1 looking in the direction of the arrows.

FIG. 5 illustrates the cross-section of nip 68 wherein insulative strips 59 are joined and adhered to insulative lattice structure 39 and to heated filaments 67. Mold and tack drum 55 has grooves 60 adjacent the edges of the exterior surface thereof similar to grooves 36 on drum 35. Similar to scraper 71, a scraper 73 shown in FIG. 1 is mounted adjacent grove 60 on drum 55 to remove the excess insulative material collected in grooves 60. Heat is applied to both drums 55 and 35 to maintain their temperature below the melting temperature of the insulative material. Therefore, as the lattice cable structure leaves nip 68, the insulative material adjacent filament 67 is still soft and melted, but the exterior of the cable lattice structure is solidified sufficiently to hold its exterior shape.

Figure 6:
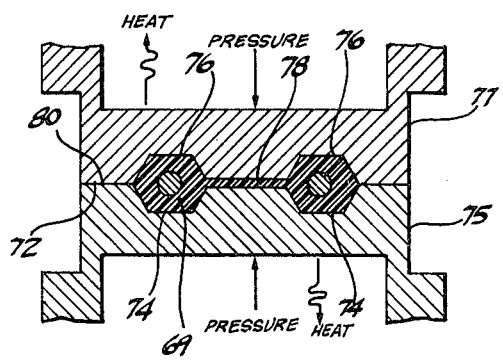
FIG. 6 shows a cross-section of a portion of the cool drums at their point of contact taken on the line 6—6 of FIG. 1 looking in the direction of the arrows.

Turning now to FIG. 6, there is illustrated a cross-section of nip 72 in which cool drums 77 and 75 accept the lattice cable structure therebetween and to remove sufficient heat therefrom to substantially solidify the insulative material around the filaments. Cool drum 77 has circumferential grooves 76 therein with a cross-slot 78 connecting therebetween similar to mold and tack drum 35 to accept that portion of the cable lattice structure equivalent to the insulative lattice structure 39. Cross-slot 78 may be omitted on cool drum 77 and is not essential to the cooling process.

Cool drum 75 has circumferential grooves 74 therein similar to drum 55 which accept that portion of the cable lattice structure equivalent to insulative strips 59. Remainder of the surface 80 of drum 77 and surface 72 of drum 75 mate with and confront each other. Sufficient pressure is applied between drums 75 and 77 in order to assure good heat conductive contact to the lattice cable structure as it passes therebetween. Heat sink 79 and heat sink 81, respectively, shown in FIG. 1, remove heat from drums 77 and 75 to insure solidification of the insulative material of the lattice cable structure as it passes through nip 72.

Figure 7:
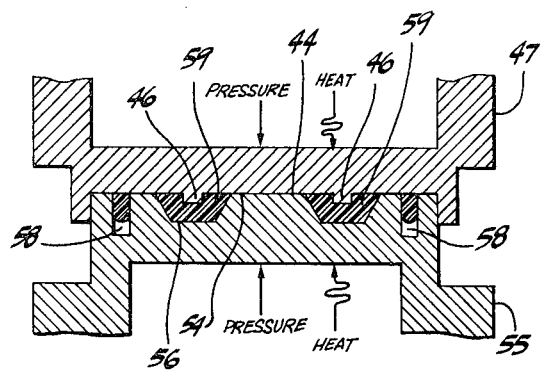
FIG. 7 illustrates a cross-section of a portion of the melt drum and the mold and tack drum in contact with one another taken along the line 7—7 of FIG. 1 looking in the direction of the arrows.

The cross-section of nip 57 is illustrative in FIG. 7 in which circumferential ridges 46 in melt drum 47 form elongated depressions in insulative strips 59 which are molded in circumferential grooves 56 in the surface of mold and tack drum 55. Similar to drum 35, drum 55 has grooves 58 adjacent the edge of the exterior surface thereof to receive excess insulative material as the melted and softened insulative material is squeezed, displaced and redistributed between the contacting surfaces 54 and 44 of drums 55 and 47, respectively.

Figure 8:
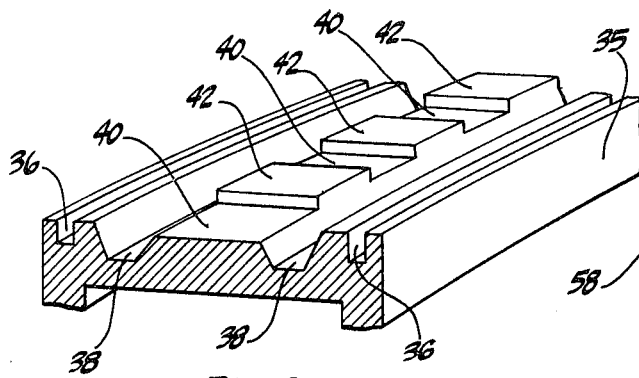
FIG. 8 shows a portion of a perspective view of the surface of the mold and tack drum of FIG. 1 and FIG. 4.

There is shown in FIG. 8 the exterior surface of mold and tack drum 35 showing circumferential grooves 38 which accept the insulative material and cross-slots 40 therebetween separated by raised portions 42 which contact the surface of melt drum 27 (not shown). Edge grooves 36 collect the excess insulative material squeezed and redistributed between the surfaces of melt drum 27 and mold and tack drum 35.

Figure 9:
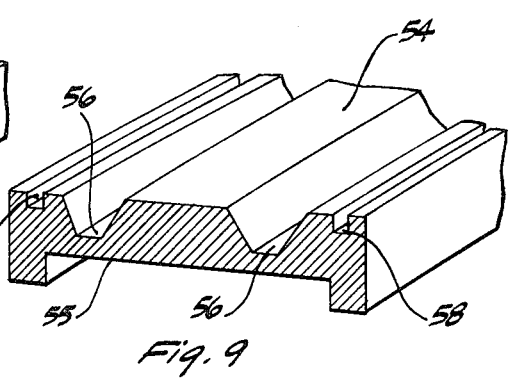
FIG. 9 illustrates a portion of a perspective view of the surface of the mold and tack drum of FIG. 1 and FIG. 7.

A portion of the surface of mold and tack drum 55 is shown in FIG. 9. Circumferential grooves 56 receive insulative material strips 59 therein. Surface 54 between grooves 56 contacts the surface of melt drum 47 (not shown) and squeezes and redistributes the soft and melted insulative material into grooves 56 with the surplus entering edge grooves 58.

Figure 10:
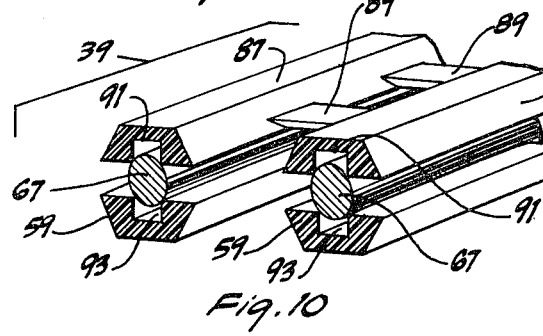
FIG. 10 shows the lattice cable structure just before the wires are embedded in the insulative material between the mold and tack drums FIG. 1.

In FIG. 10 there is shown a section of the lattice cable assembly just before entering nip 68. Insulative lattice structure 39 has elongated elements 87 separated by cross-strips 89 with an elongated depression 91 along each elongated element 87 to accept and locate one of heated filaments 67 therein. Oppositely disposed each of the elongated elements 87 is an elongated strip 59 having an elongated depression 93 therealong to accept and locate one of heated filaments 67 therein. As the insulative lattice structure 39 is pressed in contact with elongated strips 59, heated filaments 67 melt the insulative material in grooves 91 and 93 and portions of the mating surfaces between elongated elements 87 and elongated strips 59 to adhere the insulative materials together and adhere the insulative material to the filaments.

Figure 11:
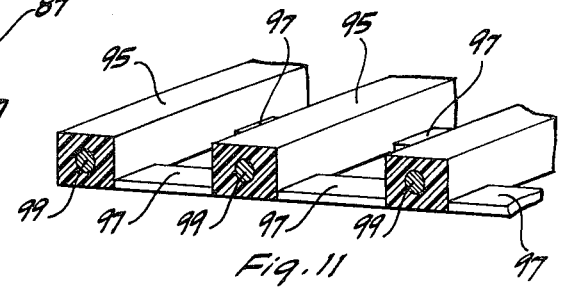
FIG. 11 illustrates a perspective view of a portion of an alternate version of a multi-conductor lattice cable.

An alternate lattice cable structure is illustrated in FIG. 11, showing a plurality of elongated filaments 99 molded into a corresponding multiplicity of elongated insulative elements 95 separated by periodically spaced slots or ribs 97. This is used to illustrate that any number and size of conductive elements in any insulative material cross-section and wire cross-section may be utilized in a lattice structure of the type contemplated by this invention.

Figure 12:
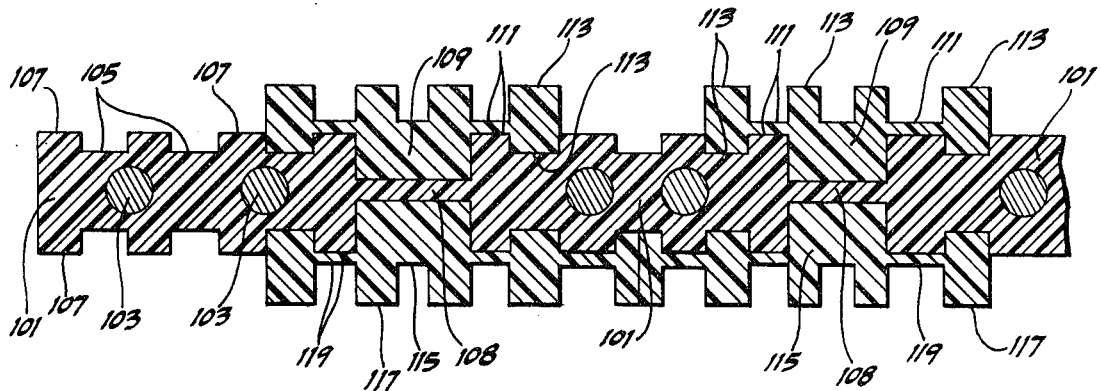
FIG. 12 illustrates a cross-section of a multi-transmission line lattice structure with an interlocking jacket.

Turning now to FIG. 12, there is illustrated a more sophisticated alternative cable structure in which a multiplicity of elongated elements 101 are shown in cross-section having a pair of wires 103 molded therein.

The external surface of elongated insulative elements 101 contain ridges 107 and grooves 105 alternately thereon which may be appropriately engaged by mating ridges 113 and grooves 111 of a jacket structure 109 interlocked between elongated elements 101. Jacket 109 may be elongated strip of insulative material of a different dielectric constant so as to isolate the electromagnetic field between conductive elements 103 of one elongated insulative strip 101 from the conductive elements of another elongated element 101. Although the insulative strips 109 as illustrated do not entirely surround or cover elongated elements 101 but are spaced therebetween, they may be made to encompass elements 101 as shown by insulative strip 115 which is designed to mate with and meet a corresponding portion of a member of another elongated strip 115 to completely enclose elongated elements 101 containing filaments 103 therein. Elongated elements 101 are connected together by periodically spaced ribs 108.

Therefore, it should be noted that the structure illustrated in FIG. 12 may be utilized to provide a multiple transmission line lattice structure with a jacket therearound or therebetween to substantially retain the electromagnetic field within the dielectric sheath around the pair of conductors to prevent distortion of high frequency pulse transmission and ringing as well as cross-talk. These results can be accomplished by selecting the respective dielectric constants for the insulative sheath material surrounding conductive elements 103 and the separating insulative material of insulative strips 109 and 115.

It now should be apparent that the present invention provides a lattice supported filament structure with a method and apparatus for making the same which may be employed in conjunction with high frequency transmission lines and flat interconnecting cables as well as fiber optics for providing a lightweight flexible, low cost structure.

Although particular components etc., have been discussed in connection with a specific embodiment of a filament lattice structure and apparatus and methods for making the same and constructed and performed in accordance with the teachings of the present invention, other components and steps may be utilized. Furthermore, it will be understood that although an exemplary embodiment of the present invention has been disclosed and discussed, other applications, methods and mechanical arrangements are possible in that the embodiments disclosed may be subject to various changes, modifications and substitutions without necessarily departing from the spirit of the invention.

What is claimed is:

1. A method for making a lattice supported filament structure comprising the steps of:

applying heat to a first film belt to melt said first film belt;

molding the heated first film belt into a lattice structure having a plurality of joined elongated members connected with periodically spaced cross-strips therebetween, each of said joined elongated members having a depression molded therealong adapted to receive and engage an elongated filament;

applying heat to a plurality of elongated filaments to heat said elongated filaments to a temperature above the melting point of said joined elongated members of said lattice structure;

bringing each of said plurality of elongated filaments into engagement with one of said depressions molded along one of said elongated members of said lattice structure;

applying pressure to the lattice combination of the heated elongated filaments engaged with said joined elongated members of said lattice structure to enable the transfer of heat from said elongated filaments to said elongated members to melt said elongated members adjacent said elongated filaments and adhere said elongated filaments to said elongated members of said lattice structure; and applying pressure and removing heat from said lattice combination to solidify said elongated members of said lattice structure adhered to said elongated filaments.

2. A method for making a lattice supported filaments structure comprising the steps of:

applying heat to a first film belt to melt said first film belt;

molding the melted first film belt into a lattice structure having a plurality of joined elongated members connected with periodically spaced cross-strip therebetween, each of said joined elongated members having a depression molded therealong adapted to receive and engage an elongated filament;

applying heat to a second film belt to melt said second belt;

molding the melted second film belt into a plurality of separate unconnected elongated members, each of said elongated members having a depression molded therealong adapted to receive and engage an elongated filament;

applying heat to a plurality of elongated filaments to heat said elongated filaments to a temperature above the melting point of said joined elongated members of said lattice structure and said separate elongated members;

bringing each of said plurality of elongated filaments into alignment with one of said depressions molded along one of said joined elongated members of said lattice structure and with one of said depressions molded along one of said separate elongated members so as to sandwich each of said plurality of elongated filaments between one of said joined elongated members and one of said separate elongated members;

applying pressure to the sandwich combination of said elongated filaments and said joined elongated members and said separate elongated members to melt said elongated members adjacent said elongated filaments and to adhere said joined elongated members to said separate elongated members and around said elongated filaments; and applying pressure and removing heat from said sandwich combination to solidify the joined and separate elongated members adhered together and around said elongated filaments.

3. The method described in claim 2 wherein the step of applying heat to said first film belt and the step of applying heat to said second film belt comprises:

contacting said first film belt with the exterior surface of a first rotating cylindrical drum heated to a temperature sufficient to melt said first film belt, the exterior surface of said first drum having a plurality of circumferential ridges therearound which contact the surface of said first film belt; and contacting said second film belt with the exterior surface of a second rotating cylindrical drum heated to a temperature sufficient to melt said second film belt, said exterior surface of said second rotating drum having a plurality of circumferential ridges therearound which contact the surface of said second film belt.

4. The method described in claim 3 wherein the step of molding melted first film belt comprises, passing said melted first film belt between the contacting exterior cylindrical surfaces of said first rotating cylindrical drum and a third rotating cylindrical drum, said third rotating cylindrical drum being heated to a temperature below the melting temperature of said first film belt and having a surface thereon embossed with a plurality of circumferential grooves and longitudinal slots therebetween into which the melted first film belt is displaced and cooled to form said lattice structure, said ridges of said first rotating drum mating with said grooves of said third rotating drum to form said depressions along said joined elongated members of said lattice structure.

5. The method described in claim 4 wherein said step of molding the melted second film belt comprises, passing said melted second film belt between the exterior contacting cylindrical surfaces of said second cylindrical drum and a forth rotating cylindrical drum, said fourth cylindrical drum being heated to a temperature below the melting temperature of said second film belt and having a surface thereon embossed with a plurality of circumferential grooves into which the melted second film belt is displaced and cooled to form said separate elongated elements, said ridges of said second cylindrical drum mating with the grooves of said fourth cylindrical drum to form said depressions along said separate elongated members.

6. The method described in claim 5 wherein said step of applying heat to a plurality of elongated filaments comprises, contacting said plurality of elongated elements with the surface of a fifth rotating cylindrical drum heated to a temperature sufficient to raise the temperature of said elongated filaments above the melting point of the first and second film belts.

7. The method described in claim 6 wherein said step of applying pressure to the lattice combination of said elongated filaments and said joined elongated members and said separate elongated members comprises, passing said combination between the contacting surfaces of said third rotating cylindrical drum and said fourth rotating cylindrical drum.

8. The method described in claim 7 wherein said step of applying pressure and removing heat comprises, passing said lattice combination between the contacting surfaces of a sixth and a seventh rotating cylindrical drum, said sixth drum and seventh drum having exterior surfaces thereon similar to said third drum and said fourth drum, respectively, said sixth drum and seventh drum being cooled to remove heat from and solidify said lattice combination.

9. Apparatus for joining a plurality of elongated filaments into a molded lattice structure comprising:

a base member adapted to support a plurality of rotating cylindrical drums and drum rotating and heating means;

a first drum rotatably attached to said base member, said first drum being cylindrical in shape and having a plurality of circumferential ridges spaced around the exterior surface thereof, said exterior surface being adapted to receive and engage a film belt in contact therewith;

means for heating said first drum to a temperature sufficient to melt a film belt placed in contact therewith;

a second drum rotatably attached to said base member, said second drum being cylindrical in shape and having a plurality of circumferential grooves spaced around the exterior surface thereof, said exterior surface further having a multiplicity of longitudinal slots periodically spaced between and connecting with said circumferential grooves, said exterior surface of said second drum being in rotational contact with said exterior surface of said first drum to form a first nip, each of said circumferential ridges of said first drum mating with and centered in a circumferential groove of said second drum, said first nip being adapted to receive a film belt in contact with said first drum and to mold the film belt into a lattice structure having a plurality of joined elongated elements with depressions therealong and cross-strips integrally connected therebetween;

a third drum rotatably attached to said base member, said third drum being cylindrical in shape and having an exterior surface in rotatable contact with said second drum to form a second nip, said second nip being adapted to receive a lattice structure in contact with said second drum and a plurality of heated elongated filaments centered in the grooves of the elongated elements of the lattice structure and to press each of the heated elongated filaments into a groove of an elongated element;

means for heating said second drum and said third drum to a temperature below the melting point of a lattice structure in contact with said second drum;

a fourth drum rotatably attached to said base member, said fourth drum being cylindrical in shape adapted to receive and engage a multiplicity of elongated filaments therearound and to conduct heat thereto;

means for heating said fourth drum to a temperature sufficient to heat the elongated filaments in contact therewith above the melting point of a lattice structure in contact with said second drum; and means for rotating the first, second and third drums.

10. The apparatus described in claim 9 further including:

a fifth drum rotatably attached to said base member, said fifth drum being substantially similar to said second drum;

a sixth drum rotatably attached to said base member, said sixth drum being substantially similar to said third drum and being in rotatable contact with said fifth drum to form a third nip adapted to receive the assembly of the lattice structure of elongated elements and elongated filaments adhered thereto and to conduct heat from the assembly to solidify the elongated elements adhered to the elongated filaments; and means for removing heat from said fifth and sixth drums to maintain the temperature of said fifth and sixth drums at a level sufficient to solidify said elongated elements.

11. The apparatus described in claim 10 wherein said third drum further has a multiplicity of circumferential grooves therearound adapted to receive separate molded and unconnected elongated elements with depressions therealong and to bring the elongated elements into said second nip to meet with and engage the oppositely disposed elongated elements of the lattice structure with the elongated filaments sandwiched therebetween in the depressions therealong, and further including:

a seventh drum substantially similar to said first drum, the exterior surface being adapted to receive a film belt in contact therewith and being in rotating contact with the exterior surface of said third drum to form a fourth nip therebetween, each of the circumferential ridges of said seventh drum mating with and being centered in a circumferential groove of said third drum, said fourth nip being adapted to receive a film belt in contact with said seventh drum and to mold the film belt into separate unconnected elongated elements with depressions therealong adapted to engage elongated filaments; and means for heating said seventh drum to a temperature to melt a film belt in contact therewith.

* * * * *